United States Patent [19]

Turpin

[11] Patent Number: 5,280,731
[45] Date of Patent: Jan. 25, 1994

[54] CONSTANT-MESH TRANSMISSION WITH A CHAIN DRIVE AND DOUBLE DISCONNECT REVERSE

[75] Inventor: George S. Turpin, Cowbridge, Wales

[73] Assignee: Borg-Warner Automotive, Inc., Sterling Heights, Mich.

[21] Appl. No.: 974,041

[22] Filed: Nov. 10, 1992

[51] Int. Cl.⁵ ............................................. F16H 3/08
[52] U.S. Cl. ..................................... 74/358; 74/333; 74/359; 74/361; 192/48.7
[58] Field of Search ................. 74/333, 358, 359, 361; 192/48.7

[56] References Cited

U.S. PATENT DOCUMENTS

| | | | |
|---|---|---|---|
| 839,512 | 12/1906 | Robinson | 74/358 |
| 1,086,674 | 2/1914 | Laskey | 74/329 X |
| 1,113,296 | 10/1914 | Belcher | 74/375 |
| 1,233,178 | 7/1917 | Budd | 74/361 |
| 1,250,546 | 12/1917 | Blydenburgh | 74/375 |
| 2,336,642 | 12/1943 | Schreck | 74/361 X |
| 2,800,037 | 7/1957 | Czuba et al. | 74/730 |
| 4,337,675 | 7/1982 | Holdeman | 74/477 |
| 4,338,828 | 7/1982 | Ruhlman | 74/475 |
| 4,515,031 | 5/1985 | Janson | 74/359 |
| 4,658,662 | 4/1987 | Rundle | 74/333 X |
| 4,674,346 | 6/1987 | Hiraiwa | 74/359 X |
| 4,727,768 | 3/1988 | Hayashi et al. | 74/701 |
| 5,105,674 | 4/1992 | Rea et al. | 74/333 |

FOREIGN PATENT DOCUMENTS

| | | | |
|---|---|---|---|
| 3231023 | 2/1984 | Fed. Rep. of Germany | 74/333 |
| 59-17045 | 1/1984 | Japan | 74/358 |
| 60-53272 | 3/1985 | Japan | 74/361 |

Primary Examiner—Leslie A. Braun
Assistant Examiner—David E. Henn
Attorney, Agent, or Firm—Reising, Ethington

[57] ABSTRACT

The constant-mesh transmission includes a gear case, an input shaft, a counter shaft and an output shaft. An input drive gear integral with the input shaft meshes with the counter shaft drive gear. First, second and third speed counter shaft gears are integral with the counter shaft. A fifth speed counter shaft gear and a counter shaft sprocket are journaled on the counter shaft. First, second and third speed driven gears are journaled on the output shaft and in mesh with the first, second and third speed counter shaft gears. A reverse driven sprocket is journaled on the output shaft. A fifth speed output shaft gear is secured to the output shaft. A chain is trained around the sprockets. Clutch assemblies are mounted on the output shaft and a clutch is mounted on the counter shaft. A clutch locks gears to the output shaft for first and second speed. A clutch locks a gear to the output shaft for third speed or locks the input shaft to the output shaft for fourth speed. A clutch locks a gear to the counter shaft for fifth gear or locks a drive sprocket to the counter shaft. A clutch locks a driven sprocket to the output shaft. A shift fork simultaneously locks a sprocket to the counter shaft and locks a sprocket to the output shaft to drive the output shaft in a reverse direction from the input shaft rotation. Some of the clutches include synchronizers.

15 Claims, 3 Drawing Sheets

CONSTANT-MESH TRANSMISSION WITH A CHAIN DRIVE AND DOUBLE DISCONNECT REVERSE

TECHNICAL FIELD

This invention relates to a constant-mesh transmission with an input shaft, a co-axial output shaft and a counter shaft. Reverse drive is through a sprocket on the output shaft, a sprocket on the counter shaft and a chain trained around the two sprockets. Clutch assemblies are provided for selectively connecting and disconnecting sprockets and gears to the shafts upon which they are journaled.

BACKGROUND OF THE INVENTION

Constant-mesh transmissions for motor vehicles have clutches which either lock a gear to the shaft the gear is journaled upon or that allow the gear to rotate relative to the shaft. In automotive type transmissions the clutches generally include a slider sleeve that locks a gear to the shaft it is mounted upon, when slid in one direction and which allows the gear to rotate relative to the shaft it is mounted upon when the slider sleeve is slid in a second direction. These clutches with sliders often include Synchronizers for at least some of the gears. Synchronizers are devices that bring the gear and the shaft it is mounted upon to the same speed before the slider engages teeth on the gear to prevent grinding between teeth on the slider and teeth on the gear. Some transmissions employ synchronizers on the high speed gears only. Other transmissions employ synchronizers on all shiftable gears.

Industrial type machines are known that employ clutches in their constant mesh transmissions that are hydraulically operated. Such transmissions are commonly referred to as power shift transmissions. The hydraulically operated clutches can be engaged and disengaged by hydraulic valves that are either manually controlled or that are controlled by an automatic or semi-automatic control system.

Constant-mesh transmissions with an input shaft, a co-axial output shaft and a counter shaft are used in many vehicle applications. These transmissions have a gear on the input shaft which meshes with a gear on the counter shaft and rotates the counter shaft. A plurality of gears with various pitch diameters are rigidly secured to the counter shaft. Gears are rotatably journaled on the output shaft and are in mesh with the gears on the counter shaft. The gears on the output shaft are selectively locked to the output shaft to transmit torque from the input shaft to the output shaft through the counter shaft. Each gear provides a specific gear ratio. These transmissions generally include a clutch that is selectively operable to lock the input shaft directly to the output shaft so that the input and output shafts run at the same speed. Because the gear on the input shaft is normally rigidly attached to the input shaft, the counter shaft is driven anytime the input shaft is driven and even when a clutch connects the input shaft directly to the output shaft and the counter shaft is not transmitting torque to the output shaft.

The input shaft rotates in the same direction as the power source. The counter shaft rotates in the opposite direction from the input shaft. The output shaft rotates in the same direction as the input shaft when driven by a gear connected to the counter shaft that is in constant mesh with a gear on the output shaft. The output shaft is driven in the opposite direction to move a vehicle in a reverse direction by providing a reverse idler shaft and a reverse idler gear on the reverse idler shaft that is in mesh with a gear on the counter shaft and a gear on the output shaft or can be moved into simultaneous mesh with a gear on the counter shaft and a gear on the output shaft, both of which are locked to the shaft they are mounted on. The transmission is shifted out of reverse by moving the reverse idler gear out of mesh with the gear on the output shaft and the gear on the counter shaft or by allowing one or both of the gears in mesh with the reverse idler gear to rotate relative to the shafts which support them.

A constant mesh transmission with one of the reverse drives described above is disclosed in U.S. Pat. No. 5,105,674 to Rea et al, the disclosure of which is incorporated by reference. The other reverse drive described above with a reverse idler gear that can be moved out of mesh with other gears is disclosed in U.S. Pat. No. 4,337,675 to Holdeman, the disclosure of which is incorporated by reference.

An output shaft can be driven in the same direction as a counter shaft and thus in reverse by mounting a sprocket on the counter shaft, a sprocket on the output shaft and training a chain around both sprockets. The chain reverse drives that have been used in the past have had one sprocket attached rigidly to one shaft and the other sprocket connected to the other shaft by a clutch. The chains used with the sprockets is a multiple link chain that is commonly referred to as a silent chain or a high speed chain. These chains include multiple links that are pivotally connected to each other by pins to form a continuous flexible belt. Chain drives have advantages over the gear drive described above. The advantages include the elimination of the reverse idler shaft and the reverse idler gear described above. Eliminating the reverse idler shaft and the bearings which support the reverse idler shaft reduces the size and weight of a transmission. Transmission size and weight are important factors in transmission design.

The characteristic of a chain drive that is utilized in a chain reverse drive is that they drive the output shaft in the same direction as the counter shaft when trained around sprockets on both the counter shaft and the output shaft. Chain reverse drives have been tried from time to time knowing that they will reverse the direction of rotation of the output shaft. These chain reverse drives have had limited success due to some undesirable characteristics of chain drives. Chain drives generally have a shorter useful life than gears. There is some wear every time the links of a chain pivot around the connecting pins. Pivoting between the links and the connecting pins occurs upon engagement with a sprocket and upon disengagement from a sprocket. In a drive with two sprockets pivoting occurs four times during each complete revolution of the chain. Wear occurs whether the chain is transmitting torque or is running without torque transmission. Wear between the links and the connecting pins of a chain can be reduced by lubrication. During high speed running of a chain, lubricating oils are thrown out by centrifugal force. This occurs even when the chain is running in an oil reservoir. Reverse movement of the typical passenger vehicle is at low speeds and for short distances. Employment of a chain drive at low speeds and for relatively short distances would seem to eliminate durability problems associated with chain drives. The chain reverse drives that have been used in the past have employed chains and sprockets that are driven and run any time the output shaft is driven even when the vehicle is driven in a forward direction and the chain is not transmitting torque to the output shaft. These chain drives frequently run at substantially higher speeds when the vehicle is being propelled in a forward direction by gears than when the vehicle is being propelled in reverse by the chain drive. When a vehicle is driven at the speed limit on a highway for more than a few miles, lubricating oil can be forced out of the pivot connections between the links and connecting pins and the chain can be damaged due to inadequate lubrication. As a result of these problems the useful life of reverse chain drives in passenger vehicles has been unsatisfactory.

The pivoting of the links of chains about their connecting pins requires some power to overcome friction. The power lost to friction in a chain is substantially more than the power lost in gear drives. The heat generated by friction in some chain drives is a serious problem. Heat generation by a chain that runs in an enclosed gear case with lubricant is generally not a problem but power loss is a problem.

Chain drives do not have the gear rattle problems that are common in the gears of constant mesh transmissions. However, chains can flop between the sprockets due to torsional vibrations. This flopping can damage bearings, shafts, sprockets and the chain itself. Flopping can also cause excessive noise. All chain drives create some noise. High speed movement of chain drives often results in excessive noise.

SUMMARY OF THE INVENTION

An object of the invention is to provide a chain drive with a long useful life.

Another object of the invention is to provide a transmission with a first sprocket on a first shaft, a second sprocket on a second shaft, a chain trained around both sprockets for transmitting torque from one sprocket to the other sprocket, a clutch assembly for connecting the first sprocket to the first shaft and a clutch assembly for connecting the second sprocket to the second shaft.

A further object of the invention is to provide a multi-ratio constant-mesh transmission with an input shaft, an output shaft, and a counter shaft with a reverse drive that includes a drive sprocket on the counter shaft, a first clutch assembly for connecting the drive sprocket to the counter shaft, a driven sprocket, a second clutch assembly for connecting the driven sprocket to the output shaft, and a multi link chain trained around the drive sprocket and the driven sprocket.

The transmission includes an enclosed gear case with an input shaft journaled in a front wall of the gear case, an output shaft journaled in a rear wall of the gear case and rotatably connected to the input shaft, and a counter shaft journaled in the gear case and spaced to one side of the input shaft and the output shaft. A plurality of gears are secured to the counter shaft. An input drive gear is secured to the input shaft. The input drive gear is in mesh with one of the gears secured to the counter shaft. A plurality of gears are journaled on the output shaft and each gear is in mesh with one of the gears secured to the counter shaft. A reverse drive sprocket is journaled on the counter shaft. A reverse driven sprocket is journaled on the output shaft. A continuous chain is trained around the reverse drive sprocket and the reverse driven sprocket. Clutch assemblies are provided for locking the gears and the sprocket on the output shaft to the output shaft when engaged and for allowing the gears and sprocket on the output shaft to rotate relative to the output shaft when disengaged. A clutch assembly is also provided for locking the drive sprocket to the counter shaft when the clutch is engaged and for allowing the drive sprocket to rotate relative to the counter shaft when the clutch is disengaged. Clutch shifters are provided for selectively engaging and disengaging the clutch assemblies. The driven sprocket is locked to the output shaft before the drive sprocket is locked to the counter shaft. The clutch assembly that locks the drive sprocket to the counter shaft includes a synchronizer. The clutch assemblies that lock the drive sprocket to the counter shaft and the driven sprocket to the output shaft are as large in diameter as space permits.

The forgoing and other objects, features and advantages of the invention will become apparent in the light of the following detailed description of an exemplary embodiment thereof, as illustrated in the accompanying drawings.

Figure 1:
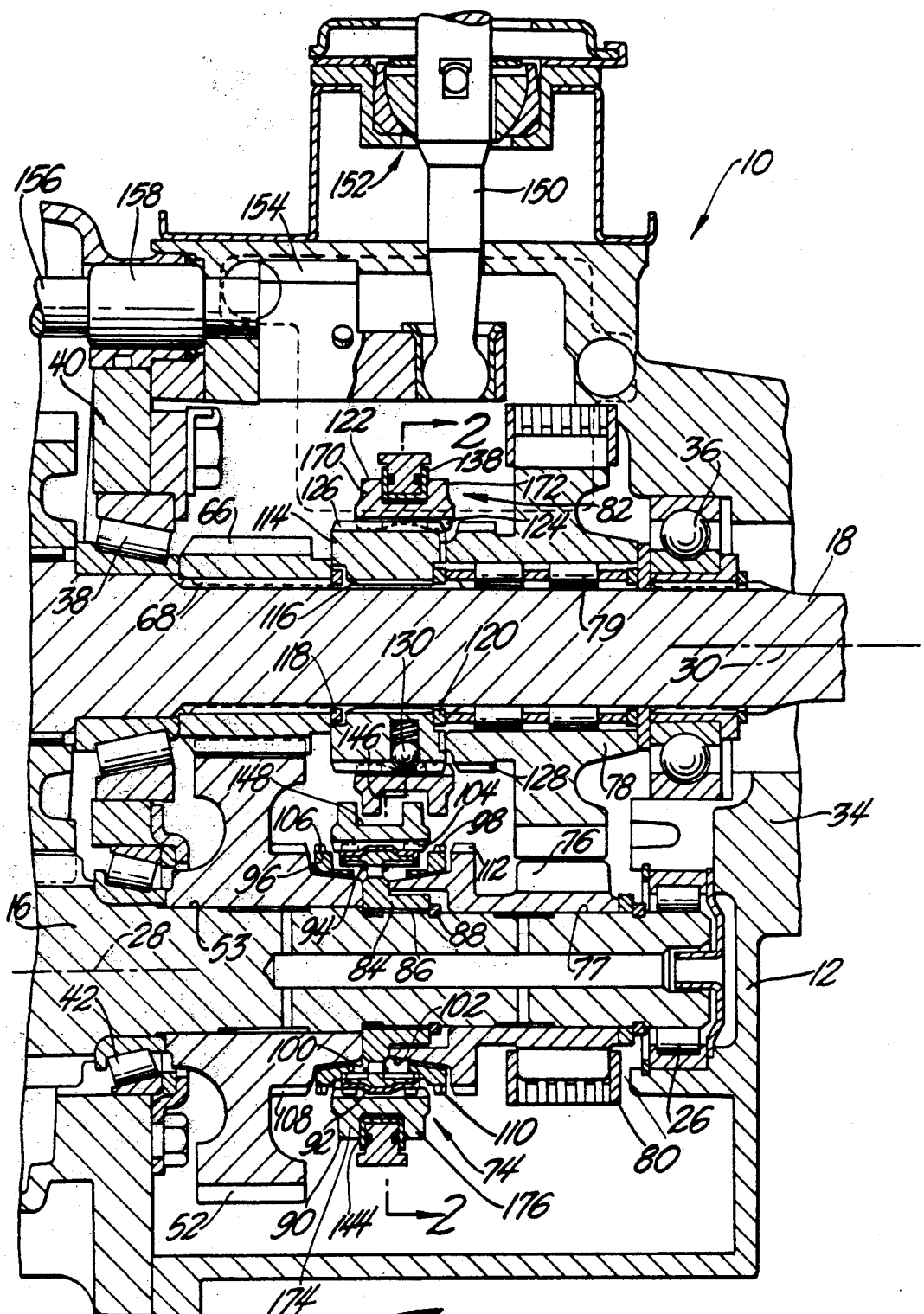
FIG. 1 is a vertical sectional view of a reverse drive portion of a transmission.

The five speed constant mesh transmission 10 includes a gear case 12, an input shaft 14, a counter shaft 16 and an output shaft 18. The input shaft 14 is rotatably supported in a front wall of the gear case 12 by a bearing 20. An end of the input shaft 14 extends out of the gear case 12. The end of the input shaft 14 that is outside the gear case 12 is to be driven by an internal combustion engine through a clutch assembly. The input shaft 14 could also be driven by an electric or hydraulic motor if desired. An input drive gear 22 is secured to or integral with the input shaft 14.

A counter shaft 16 is rotatably supported in the gear case 12 by bearing 24 and 26 for rotation about an axis 28 that is spaced from and parallel to the input shaft axis of rotation 30. The output shaft 18 has one end journaled in a bearing 32 in a bore in an end of the input shaft 14 and an end journaled in a rear wall 34 of the housing 12 by a bearing 36. The output shaft 18 is rotatable about the axis 30 of the input shaft 14. An intermediate bearing 38 is mounted in a bore in an internal gear case bulkhead 40 to support a center portion of the output shaft 18. A bearing 42 is mounted in another bore in the bulkhead 40 to support a center portion of the counter shaft 16.

A counter shaft drive gear 44 is integral with the counter shaft 16 and in mesh with the input drive gear 22. The counter shaft 16 is driven anytime the input shaft 14 rotates. A first speed drive gear 46, a second speed counter shaft gear 48 and a third speed counter shaft gear 50 are integral with the counter shaft 16. A fifth speed counter shaft gear 52 is rotatably journaled on the counter shaft 16 by a bearing surface 53.

A first speed driven gear 54 is rotatably journaled on the output shaft 18 by a roller bearing 56 and is in mesh with first speed counter shaft gear 46. A second speed driven gear 58 is rotatably journaled on the output shaft 18 by a roller bearing 60 and is in mesh with the second speed counter shaft gear 48. A third speed driven gear 62 is rotatably journaled on the output shaft 18 by a roller bearing 64 and is in mesh with the third speed counter shaft gear 50. A fifth speed output shaft gear 66 is connected to the output shaft 18 by splines 68 and is in mesh with the fifth speed drive gear 52.

A clutch assembly 70 is mounted on the output shaft 18 between the first speed driven gear 54 and the second speed driven gear 58. The clutch assembly 70 can either lock the first speed driven gear 54 or the second speed driven gear 58 to the output shaft 18. A clutch assembly 72 is mounted on the output shaft 18 between the third speed driven gear 62 and the input drive gear 22 on the input shaft 14. The clutch assembly 72 can either lock the third speed driven gear 62 to the output shaft 18 or it can lock the output shaft 18 to the input shaft 14. When the output shaft 18 is connected to the input shaft 14 the drive is straight through and the output speed is the same as the input speed. In the transmission 10, as shown, a fourth speed is obtained when the input shaft 14 and the output shaft 18 are locked together by the clutch assembly 72. A clutch assembly 74 is mounted on the counter shaft 16 adjacent to the fifth speed counter shaft gear 52. The clutch assembly 74 can lock the fifth speed counter shaft gear 52 to the counter shaft 16. When the fifth speed counter shaft gear 52 is locked to the counter shaft 16, the output shaft 18 is driven at a faster speed than the input shaft 14. The five speed constant mesh transmission 10 is referred to as an overdrive transmission because the output shaft 18 is driven faster than the input shaft 14 when torque is transmitted through the fifth speed counter shaft gear 52 and the fifth speed output shaft gear 66. The gear ratios can be changed for each of the torque paths through the transmission by changing the pitch diameters of the various gears. Fourth speed as shown provides a one-to-one ratio. A one-to-one ratio is provided in most vehicle transmissions and is generally not considered to be changeable. The gear ratio that provides the fifth speed could for, example be, changed to provide a speed that is slower than the speed provided by the first speed counter shaft gear 46 and the first speed driven gear 54, if desired.

The constant-mesh transmission 10 has a reverse drive system that includes a counter shaft sprocket 76 rotatably journaled on the counter shaft 16 by a bearing surface 77 and a reverse driven sprocket 78 rotatably journaled on the output shaft 18 by a bearing 79. A continuous multi link chain 80 is trained around the counter shaft sprocket 76 and the reverse driven sprocket 78. The continuous multi link chain 80 is preferably the type of chain that is commonly referred to as either a high speed chain or a silent chain. The clutch assembly 74 can either lock the counter shaft sprocket 76 to the counter shaft 16 or lock the fifth speed counter shaft gear 52 to the counter shaft. A clutch assembly 82 is mounted on the output shaft 18 between the fifth speed output shaft gear 66 and the reverse driven sprocket 78. The clutch assembly 82 can lock the reverse drive sprocket 78 to the output shaft 18. When the counter shaft sprocket 76 is locked to the counter shaft 16 by the clutch assembly 74 and the reverse driven sprocket 78 is locked to the output shaft 18 by the clutch assembly 82, the output shaft 18 is driven in the same direction as the counter shaft. Since the counter shaft 16 is driven in the opposite direction from the input shaft 14 by the input drive gear 22 and the counter shaft drive gear 44, the output shaft 18 is driven in the opposite direction from the input shaft 14 by the counter shaft sprocket 76 and the reverse driven sprocket 78. The output shaft 18 is driven in reverse when it is driven in the opposite direction to the input shaft 14. The counter shaft sprocket 76 has fewer teeth and a smaller diameter than the reverse driven sprocket 78 to reduce output speed and to increase torque when the output shaft 18 is driven in reverse. The reverse drive ratio can be changed by changing the number of teeth in the counter shaft sprocket 76 or the driven sprocket 78 or by changing the number of teeth in both the counter shaft sprocket and the driven sprocket.

The clutch assemblies 70, 72, 74 and 82 can take many forms. They can be hydraulically activated clutches, slider rings or synchronizers. Generally they are synchronizers in automotive transmissions.

The clutch assembly 74, as shown in FIG. 1, is a synchronizer. Numerous synchronizers are available. The clutch assembly 74 has a synchronizer hub 84 that is connected to the counter shaft 16 by splines 86 and is axially retained by a snap ring 88. A synchronizer sleeve 90, with internal splines 104, slides over splines on the outer surface of the synchronizer hub 84. Synchronizer keys 92 are mounted in slots in the synchronizer hub 84 and are biased outwardly by a pair of springs 94. A blocking ring 96 is positioned on a conical surface 100 on the fifth speed drive gear 52. Another blocking ring 98 is positioned on a conical surface 102 on the counter shaft sprocket 76. Moving the synchronizer sleeve 90 to the left, as seen in FIG. 1, causes the synchronizer keys 92 to contact the blocking ring 96 and move the blocking ring into contact with the conical surface 100. The conical surface 100 and a conical surface on the blocking ring 96 function as a friction brake. The braking action of the conical surface 100 and the blocking ring 96 causes the fifth speed counter shaft gear 52 and the counter shaft 16 to rotate at the same speed or to stop rotating. Continued movement of the synchronizer sleeve 90 to the left brings the chamfered ends of the splines 104 into contact with blocking ring 96, moves the splines 104 between teeth 106 on the blocking ring and moves the splines 104 into engagement with the splines 108 on the fifth speed counter shaft gear 52. When the splines 104 in the synchronizer sleeve 90 are in engagement with the splines 108 and the splines on the synchronizer hub 84, the fifth speed counter shaft gear 52 is locked to the counter shaft 16.

Movement of the synchronizer sleeve 90 to the right, as seen in FIG. 1, causes the synchronizer keys 92 to contact the blocking ring 98 and move the blocking ring into contact with the conical surface 102 on the counter shaft sprocket 76. The conical surface 102 and a conical surface on the blocking ring 98 function as a friction brake. The braking action of the conical surface 102 and the blocking ring 98 causes the counter shaft sprocket 76 and the counter shaft 16 to rotate at the same speed or to stop rotating. Continued movement of the synchronizer sleeve 90 to the right brings the chamfered ends of the splines 104 into contact with the blocking ring 98, moves the splines 104 between teeth 110 on the blocking ring and moves the splines into engagement with splines 112 on the counter shaft sprocket 76. When the splines 104 in the synchronizer sleeve 90 are in engagement with the splines 112 and the splines on the synchronizer hub 84, the counter shaft sprocket 76 is locked to the counter shaft 16.

The clutch assembly 82, as shown in FIG. 1, includes a hub member 114 that is connected to the output shaft 18 by splines 116. The hub member 114 is axially fixed on the output shaft between snap rings 118 and 120. A sleeve 122, with internal splines 124, slides over the hub member 114 and the internal splines engage external splines 126 on the hub member 114. Movement of the sleeve 122 to the right, as shown in FIG. 1, causes the internal splines 124 of the sleeve to engage splines 128 on the reverse driven sprocket 78. When the internal splines 124 of the sleeve 122 are in engagement with the external splines 126 and the splines 128, the reverse driven sprocket 78 is locked to the output shaft 18. A spring-loaded detente 130 is provided to hold the sleeve 122 in a neutral position when it is shifted into a neutral position.

Figure 2:
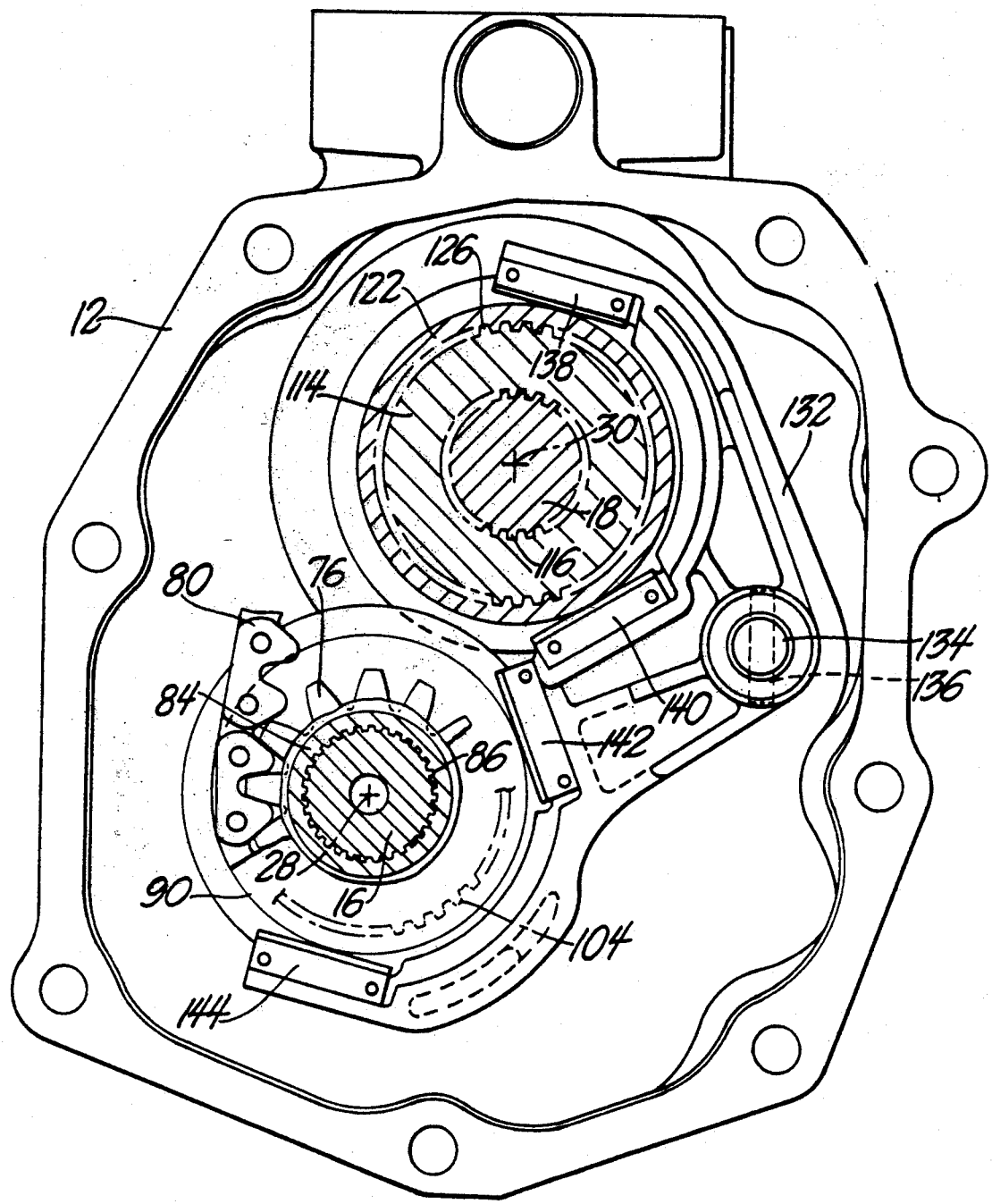
FIG. 2 is a sectional view taken along line 2—2 in FIG. 1 with parts broken away.
Figure 3:
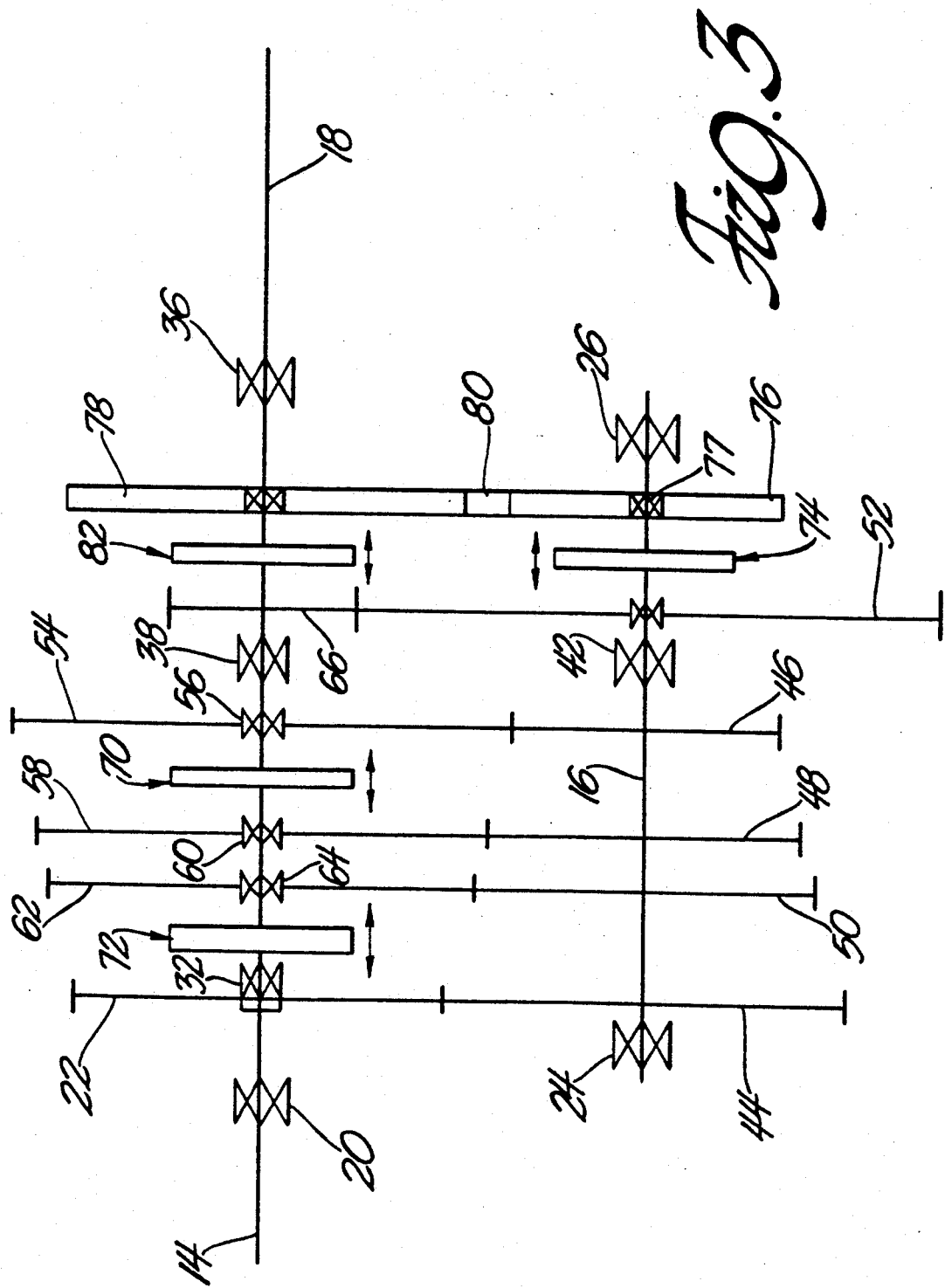
FIG. 3 is a schematic view of a five speed constant mesh transmission with a reverse chain drive.

The clutch assemblies 74 and 82 are shifted by a fifth speed and reverse shifting fork 132 shown in FIG. 2. The fifth speed and reverse shifting fork 132 is attached to a shift shaft 134 by a pin 136. The shift shaft 134 is axially shiftable to engage and disengage the clutch assemblies 74 and 82. Shift fork pads 138, 140, 142 and 144 are attached to pad support surfaces on the fifth speed and reverse shifting fork 132. The shift fork pads 138 and 140 are positioned in a radially extending groove 146 in the sleeve 122. The shift fork pads 142 and 144 are positioned in a radially extending groove 148 in the synchronizer sleeve 90.

The counter shaft sprocket 76, the reverse driven sprocket 78 and the continuous multi-link chain 80 are generally stationary except when the output shaft 18 is driven in reverse by the continuous multi-link chain. The output shaft 18 is normally stationary when a transmission 10 is shifted into reverse. The counter shaft 16 rotates anytime the input shaft 14 is rotating. The input shaft 14 rotates when a power source, such as a vehicle engine, is running and the clutch is engaged. The input shaft 14 and the counter shaft 16 may rotate for some period of the time after the clutch is disengaged as a result of the inertia in the input shaft 14, the counter shaft 16, and the gears attached to the input shaft and the counter shaft. When the reverse shifting fork 132 is moved in the direction to engage the reverse drive, the spring-loaded detente 130 is overcome, and the chamfered ends of the internal splines 124 in the sleeve 122 engage the splines 128 on the reverse driven sprocket 78. The clutch assembly 82 does not require a synchronizer because the output 18 and the reverse driven sprocket 78 are not generally rotating relative to each other when the splines 128 on the reverse driven sprocket 78 are first engaged by the internal splines 124 in the sleeve 122 of the clutch assembly 82. Continued movement of the reverse shifting fork 132 in the direction to engage the reverse, after initial engagement between the splines 124 in the sleeve 122 and the splines 128 on the reverse driven sprocket 78, will activate the synchronizer in the clutch assembly 74, stop rotation of the counter shaft 16 relative to the counter shaft sprocket 76 and then lock the counter shaft sprocket to the counter shaft. The clutch 82 engages before the clutch 74 because the sleeve 122 is positioned close to the reverse driven sprocket 78 and starts to engage the reverse driven sprocket with less movement of the reverse shifting fork 132 than is required to start activation of the synchronizer in the clutch assembly 74.

The sleeve 122 of the clutch 82 has a front radial flange 170 and a rear radial flange 172 that define sides of the groove 146 that receives the shift fork pads 138 and 140. The synchronizer sleeve 90 of the clutch assembly 74 has a front radial flange 174 and a rear radial flange 176 that define the sides of the groove 148 that receives the shift fork pads 142 and 144. The sleeve 122 of the clutch 82 is positioned to the rear of the synchronizer sleeve 90 of the clutch assembly 74. This allows the radial flange 176 of the synchronizer sleeve 90 to project into the groove 146 in the sleeve 122 and the front radial flange 170 of the sleeve 122 to project into the groove 148 in the synchronizer sleeve 90. This overlapping or entwining of the sleeve 122 of the clutch 82 and the synchronizer sleeve 90 of the clutch assembly 74, as shown in FIG. 1, permits the employment of splines 104 in the synchronizer sleeve 90 and splines 124 in the sleeve 122 that have the largest possible diameter. The largest possible diameter is desirable to reduce wear and to provide the desired shifting force and shift control lever 150 travel.

Shift forks (not shown) are provided to shift the clutches 70 and 72. The forks are moved axially to shift the clutches by a shift control lever 150 that is pivotally attached to the gear case 12 by a ball assembly 152. The shift control lever 150 is moved manually and is connected to the shift forks by an offset lever 154 and a shift shaft 156. Movement of the shift control lever 150 from side to side rotates the offset lever 154 and the shift shaft 156 about the axis of the shift shaft. Movement of the shift control lever 150 to the front or rear moves the shift shaft 156 axially in the bearing support 158. Movement of the shift shaft 156 axially to the right or left, as shown in FIG. 1, moves the shift fork connected to the clutch 70, the shift fork connected to the clutch 72 or an arm connected to shift shaft 134 to move the fifth speed and reverse shifting fork 132. Only one shift fork is moved at a time. The fork which is moved depends upon the position to which the shift shaft 156 is rotated before it is moved axially.

It is to be understood that the embodiments described are exemplary only and that the invention is defined in the appended claims which contemplate various modifications within the spirit and scope of the invention.

I claim:

1. A transmission including a gear case; a first shaft journaled in the gear case; a first sprocket rotatably journaled on the first shaft and axially fixed relative to the first shaft; a clutch mounted on the first shaft and operable to lock the first sprocket to the first shaft when engaged and to allow the first sprocket to rotate relative to the first shaft when disengaged; a second shaft journaled in the gear case; a second sprocket rotatably journaled on the second shaft and axially fixed relative to the second shaft; a clutch mounted on the second shaft and operable to lock the second sprocket to the second shaft when engaged and to allow the second sprocket to rotate relative to the second shaft when disengaged; and an endless belt trained around the first sprocket and the second sprocket which is disengaged from the first shaft and the second shaft when the clutch mounted on the first shaft and the clutch mounted on the second shaft are both disengaged.

2. A transmission as set forth in claim 1 wherein the clutch mounted on the first shaft includes a hub fixed to the first shaft and having splines on a radially outer surface, a first shiftable sleeve with internal splines that engage the splines on the radially outer surface of the hub fixed to the first shaft, splines integral with the first sprocket, and wherein the first shiftable sleeve of the clutch mounted on the first shaft is axially shiftable between an engaged position in which the first shiftable sleeve engages the splines on the hub fixed to the first shaft and the splines integral with the first sprocket and a disengaged position in which the first shiftable sleeve is out of engagement with the splines on the first sprocket; and wherein the clutch mounted on the second shaft includes a hub fixed to the second shaft and having splines on a radially outer surface, a second shiftable sleeve with internal splines that engage splines on the radially outer surface of the hub fixed to the second shaft, splines integral with the second sprocket, and wherein the second shiftable sleeve of the clutch mounted on the second shaft is axially shiftable between an engaged position in which the second shiftable sleeve engages the splines on the hub fixed to the second shaft and the splines integral with the second sprocket and a disengaged position in which the second shiftable sleeve is out of engagement with the splines on the second sprocket.

3. A transmission as set forth in claim 2 including a shifting fork mounted in the gear case and in engagement with the first shiftable sleeve and the second shiftable sleeve and wherein the shifting fork is operable to simultaneously move both the first shiftable sleeve and the second shiftable sleeve to engaged positions.

4. A transmission as set forth in claim 3 wherein the shifting fork is operable to simultaneously move both the first shiftable sleeve and the second shiftable sleeve to disengaged positions.

5. A transmission as set forth in claim 2 wherein the first shiftable sleeve has a pair of radial flanges that form the sides of a first shift fork groove, the second shiftable sleeve has a pair of radial flanges that form the sides of a second shift fork groove and wherein one of the radial flanges on the first shiftable sleeve is positioned between the pair of radial flanges that form the sides of a shift fork groove on the second shiftable sleeve.

6. A transmission as set forth in claim 5 including a shifting fork mounted in the gear case and in engagement with the first shift fork groove in the first shiftable sleeve and in engagement with the second shift fork groove in the second shiftable sleeve.

7. A transmission as set forth in claim 6 wherein the shifting fork is moveable in one direction to engage the clutch mounted on the first shaft and the clutch mounted on the second shaft and is moveable in another direction to disengage the clutch mounted on the first shaft and the clutch mounted on the second shaft.

8. A transmission as set forth in claim 1 wherein at least one of the clutches includes a synchronizer.

9. A multi-ratio constant mesh transmission including a gear case; an input shaft rotatably journaled in the gear case; an output shaft rotatably journaled in the gear case; a counter shaft mounted in the gear case and spaced from the input shaft and the output shaft; an input drive gear secured to and integral with the input shaft and a counter shaft drive gear integral with the counter shaft and in mesh with the input drive gear; a first ratio forward drive including a first ratio drive gear secured to the counter shaft, a first ratio driven gear journaled on the output shaft and in mesh with the first ratio drive gear secured to the counter shaft, and a first ratio clutch assembly mounted on the output shaft and operable to lock the first ratio driven gear to the output shaft when engaged and to allow the first ratio driven gear to rotate relative to the output shaft when the first ratio clutch assembly is disengaged; and a reverse drive including a drive sprocket rotatably journaled on the counter shaft and axially fixed relative to the counter shaft, a driven sprocket journaled on the output shaft and axially fixed relative to the output shaft, a drive sprocket clutch mounted on the counter shaft and operable to lock the drive sprocket to the counter shaft when engaged, a driven sprocket clutch mounted on the output shaft and operable to lock the driven sprocket to the output shaft, and an endless chain trained around the drive sprocket and the driven sprocket.

10. A multi-ratio constant mesh transmission as set forth in claim 9 including a shifting fork connected to the driven sprocket clutch and the drive sprocket clutch and operable to engage the driven sprocket clutch and drive sprocket clutch.

11. A multi-ratio constant mesh transmission as set forth in claim 9 wherein the drive sprocket clutch includes a hub secured to the counter shaft and having a splined surface, a splined surface on the drive sprocket, and a slider sleeve in engagement with a splined surface on the hub secured to the counter shaft and slidable into and out of engagement with the splined surface on the drive sprocket; and wherein the driven sprocket clutch incudes a hub secured to the output shaft and having a splined surface, a splined surface on the driven sprocket, and a slider sleeve in engagement with the splined surface on the hub secured to the output shaft and slidable into and out of engagement with the splined surface on the driven sprocket.

12. A multi-ratio constant mesh transmission as set forth in claim 11 including a reverse shift fork mounted in the gear case and in engagement with the drive sprocket slider sleeve and operable to move the drive sprocket slider sleeve into and out of engagement with the splined surface on the drive sprocket, and in engagement with the driven sprocket slider sleeve and operable to move the driven sprocket slider sleeve into and out of engagement with the spline surface on the driven sprocket.

13. A multi-ratio constant mesh transmission as set forth in claim 12 wherein the reverse shift fork is moved in one direction to engage the drive sprocket clutch and the driven sprocket clutch and wherein the reverse shift fork is moved in a second direction to disengage the drive sprocket clutch and the driven sprocket clutch.

14. A multi-ratio constant mesh transmission as set forth in claim 13 wherein the reverse shift fork moves the driven sprocket slider sleeve into engagement with the splined surface on the driven sprocket before the drive sprocket slider sleeve is moved into engagement with the splined surface on the drive sprocket during engagement of the drive sprocket and driven sprocket clutches.

15. A multi-ratio constant mesh transmission as set forth in claim 11 wherein the slider sleeve in the drive sprocket clutch has a pair of radial flanges that form the sides of a shift fork groove, the slider sleeve in the driven sprocket clutch has a pair of radial flanges that form the sides of a shift fork groove and wherein one of the radial flanges on the slider sleeve in the drive sprocket clutch is positioned between the pair of radial flanges on the slider sleeve in the driven sprocket clutch.

* * * * *